Nov. 24, 1959   J. J. NESLER ET AL   2,914,704
ABNORMAL VOLTAGE PROTECTION CIRCUIT
Filed Oct. 31, 1955   2 Sheets-Sheet 1

JOHN JOSEPH NESLER
ROBERT EUGENE HULL
INVENTORS

BY
ATTORNEY

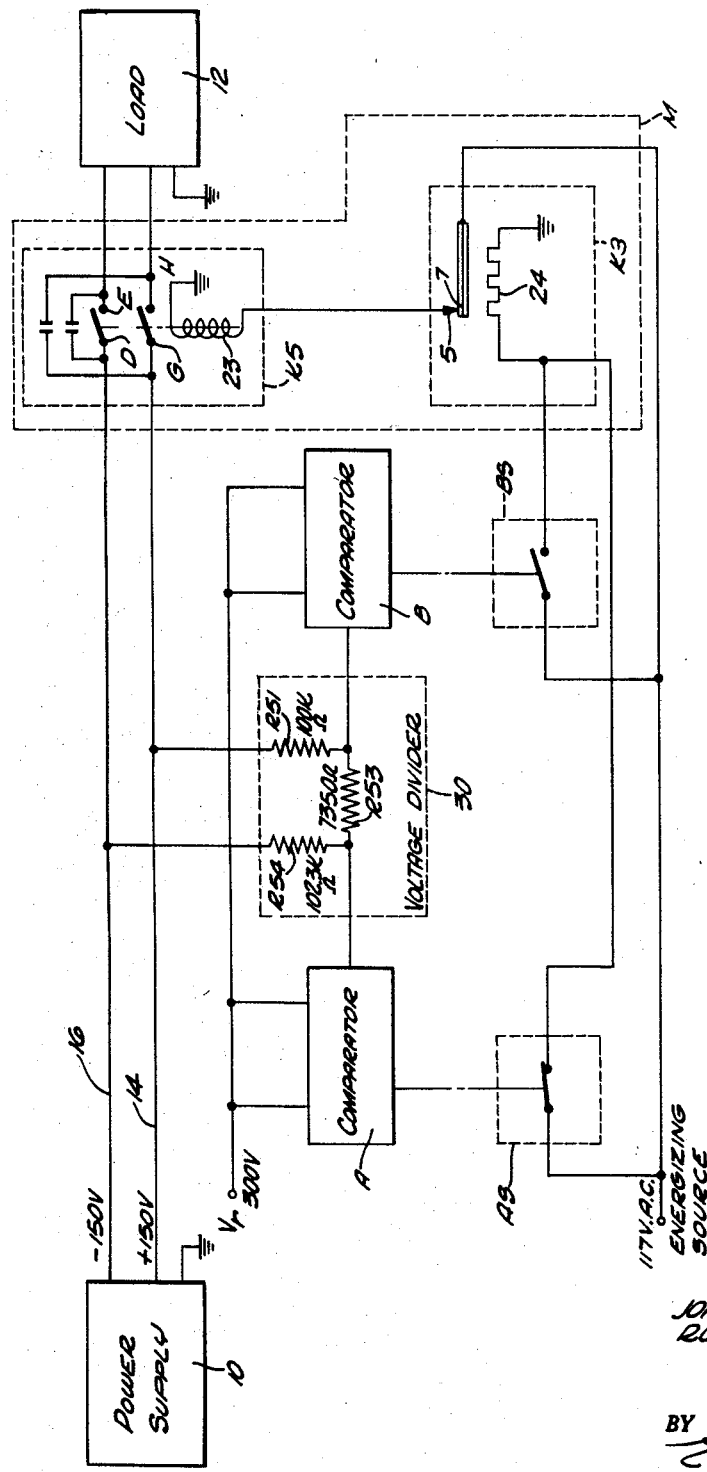

United States Patent Office 2,914,704
Patented Nov. 24, 1959

2,914,704

ABNORMAL VOLTAGE PROTECTION CIRCUIT

John Joseph Nesler, Huntington Park, and Robert Eugene Hull, Culver City, Calif., assignors to Gilfillan Bros., Inc., Los Angeles, Calif., a corporation of California Application October 31, 1955, Serial No. 543,677

13 Claims. (Cl. 317—51)

This invention relates to protective devices and, more particularly, to circuits for preventing electrical apparatus from being subjected to excessive or inadequate voltages or currents.

The over-voltage and under-voltage protective circuit of the present invention may have many applications in indicating the fact that a power supply is malfunctioning, or in disconnecting a load impedance from a power supply in response to detected over-voltage or under-voltage conditions. It is particularly useful, however, in protecting subminiature tubes from destruction by the malfunctioning of a power supply. For example, subminiature tubes often overheat and burn out when even moderate over-voltages are employed. They also overheat and burn out when their negative bias supply fails.

In the prior art combined over-voltage and under-voltage protection circuits may be found which rely solely upon the use of relays, or alternatively include both relay and amplifier circuits to provide extra-sensitive protective circuits. U.S. Patent No. 2,601,473 to C. L. Van Weynsbergen, and U.S. Patent No. 2,645,765 to W. H. Bixby, show typical relay and series relay-amplifier circuits, respectively.

The Van Weynsbergen type of relay protective circuit is very insensitive to critical changes in power supply output voltages since reliance is made upon the current sensitivity of the relay itself. The Bixby protective circuit is somewhat more sensitive although on-off switching action at a particular power supply output voltage level is still impossible with the use of the Bixby device.

Some further improvement in sensitivity is found in the prior art where an alternating current generator output voltage is controlled by an under-voltage protective circuit by use of a serially connected triode and relay, the triode being operated by a parallel connected amplifier. A circuit of this type is found in U.S. Patent No. 2,323,857 to B. Trevor. This protective circuit, or voltage control apparatus, is apparently the most sensitive of the protective circuits contained in the prior art; however, improvement in sensitivity of that obtained with the Trevor device may still be made. Furthermore, the Van Weynsbergen, Bixby and Trevor protective circuits all involve components which would cause the protective circuit to fail when any one of the components would fail or when any power supply to any of the components would fail.

Absolute safety is obviously the ultimate aim of any really satisfactory protective device. However, none of the above-described protective circuits of the prior art incorporate components, the failure of which may always be detected under any condition. These over-voltage or under-voltage protective circuits thus are not ideal because they will not always prevent damage to the electronic equipment associated with them.

The present invention overcomes the above-described and other disadvantages of the prior art by providing a protective device utilizing a regenerative amplifier type of voltage comparison circuit to make the device extraordinarily sensitive.

In the prior art arrangements the signal level required to actuate a relay through the associated amplifier and that which is present when the relay is de-energized, may be considerably different due to the well-known holding characteristic of the relay winding. This difference in "turn-on" and "turn-off" signal levels is referred to as a hysteresis characteristic and may be considerably reduced through the employment of the regenerative amplifier comparator of the present invention.

In its general form the basic comparator employed with the protective device of the present invention includes first and second amplifiers, where the input circuit of the first amplifier receives the power supply signal to be regulated or a suitable voltage division thereof. The output circuit of the first amplifier receives a suitable voltage reference signal through a load impedance, the junction therewith being coupled to the input circuit of the second amplifier. The voltage reference signal is applied directly to the output circuit of the second amplifier.

The relay to be actuated then is connected in the series current path of one of the amplifiers, typically the second amplifier, and both amplifiers are made to share a common regenerating load impedance.

Where vacuum tube amplifiers are employed, the first and second amplifiers may be triodes, the anode of each triode constituting the output circuit thereof, and the grid electrodes the input circuits. The current series path then is obtained through the cathode of one of the amplifiers connected in series with one end of the relay winding to be actuated. The other end of the relay winding and the cathode of the other amplifier are then coupled together into a common cathode load impedance which is connected to ground.

This arrangement then makes it possible to obtain a very sharply varying current condition through the relay winding so that either substantially no current passes therethrough or, as the signal level applied to the grid of the first amplifier passes a predetermined level, a substantial current will pass through the relay winding.

It may be noted here that the comparator of the invention may be arranged to be normally either in a condition where the relay winding receives a heavy actuating current or where it normally receives substantially no actuating current.

Another important feature of the invention is that if any of the amplifying tubes burn out, an indication is available that the circuit is not operating properly. Thus the comparator arrangement is essentially self-checking, whereas the utilization of a single amplifier relay circuit such as is found in the prior art is not self-checking since the failure to close the relay may represent a normal operation even though the amplifier tube has burned out.

In addition to providing an improved comparator circuit for detecting an abnormal voltage condition, the invention also contemplates several arrangements of a plurality of comparators which may simultaneously detect both over and under-voltage conditions, or the abnormal states of a plurality of different voltages.

In particular, the over-voltage and under-voltage conditions of a signal may be detected in a system of the invention wherein first and second comparators are employed controlling first and second switching devices, respectively. One of the comparators is arranged to change states when a positive signal becomes more positive than a selected limit or a negative signal becomes less negative than a selected limit. The other comparator is arranged to change states when the positive signal becomes less positive or the negative signal becomes more negative.

The first and second switches then are interconnected to provide an actuating signal for a circuit breaker so that when neither the first or second comparator is caused to change state due to the detection of an abnormal signal condition, the breaker remains in a state providing a coupling circuit between the power supply and the load. If either of the comparators is caused to change state, however, the circuit breaker is actuated to remove the load from the power supply.

Besides detecting both over- and under-voltage conditions in the signal to be analyzed, the double comparator arrangement just described is also further self-checking in that any amplifier failure which may occur in the comparators to cause a change in state thereof will be detected and will result in an actuation of the circuit breaker to separate the load and power supply. In this regard, the comparator amplifiers preferably have serially connected filaments to prevent a line-to-load connection when any of the filaments burns out.

In general two basic types of switching may be employed with the double comparator system just described. If each comparator is arranged to be normally energized in response to a predetermined low input signal and to be de-energized as the signal passes through a predetermined higher level; one comparator may be held in a normally enegrized condition may be employed to detect when a positive signal becomes more positive or a negative signal becomes less negative. A switch is then employed with the comparator that is normally closed but actuated to an open condition when the comparator is energized. In this arrangement the other comparator is made to be normally de-energized so that it will detect when the positive signal becomes less positive or the negative signal becomes more negative. A switch associated with the other comparator then is made to be normally open. The two switches then are arranged so that the change of state of either of the comparators, resulting in the closure of the associated switch, will actuate the circuit breaker to disconnect the load. Effectively then the switches are arranged in parallel so the change in position of either opens the circuit.

The equivalent of the above arrangement exists where the normally de-energized comparator is utilized with a normally closed switch and the normally energized comparator is then associated with a normally open switch causing it to close unless there is an abnormal condition which is detected. In this arrangement then the switches are connected in series to the circuit breaker so that if the normally de-energizing comparator is energized, it causes a break in the series connection between the switches; or, in a similar manner, if the normally energized comparator is de-energized, it causes the associated switch to return to its normally open condition, also breaking the series switch connection. In this arrangement then the circuit breaker is normally open and is actuated to a closed state as long as no over or under-voltage condition is detected.

A further improvement in utilizing the comparator of the invention may be achieved through the employment of a combining circuit allowing the application of the two or more power supply signals thereto so that all of these signals may be analyzed through the same device. The combining circuit allows the detection of separate changes in the various voltages applied to the comparator as well as changes in the same sense, although the circuit is insensitive to signal changes in an opposite sense of the same magnitude, where a cancellation results.

In one specific form the combining circuit is arranged to apply two voltage signals to two comparators and includes first and second high impedance resistors having first ends respectively receiving the two signals. The other ends of the high impedances are coupled to the comparators respectively and are joined by a low impedance resistor. The low impedance resistor establishes a voltage difference between the signal applied to the two comparators so that one comparator may be maintained in a normally energized state and the other in a normally de-energized state. Thus the utilization of the combining circuit makes it possible to simultaneously detect both under- and over-voltage conditions for two signals except for the one possibility of signal variations in the opposite sense of the same magnitude. This latter possibility may be considered to be trivial due to the fact in the conventional power supply signal variations for both positive and negative signals would be in the same sense although the magnitude variations may be somewhat independent.

Without the improvement provided by the combining circuit employed in accordance with the invention, one comparator would be required to detect each abnormal condition in an input signal. Thus complete protection for two power supply signals would otherwise require four comparators, two being arranged to detect the conditons of one power supply signal and two being arranged to detect the conditions of the other power supply signal.

Accordingly, it is an object of the present invention to provide a sensitive abnormal voltage protection circuit.

Another object of the invention is to provide a comparator circuit which may be employed in the protective device for disconnecting a power supply from a load for certain abnormal conditions, the comparator circuit being highly sensitive to signal changes of a predetermined level and being adapted to actuate a circuit breaker.

Yet another object of the invention is to provide a protective circuit for detecting the over- and under-voltage conditions of two signals, where only two comparators are required receiving signals through a combining circuit.

A further object is to provide a voltage protecting circuit which is inherently self-checking, the circuit including comparators arranged to assume certain predetermined states for the normal operating conditions and to change states due to abnormal voltage conditions or to the failure of certain components thereof.

Yet a further object of the invention is to provide a highly sensitive comparator circuit for a voltage protection device the comparator circuit having a greatly reduced hysteresis characteristic over that available in conventional protective devices.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 3 is a partial schematic diagram of still another embodiment of the invention.

Figure 1:
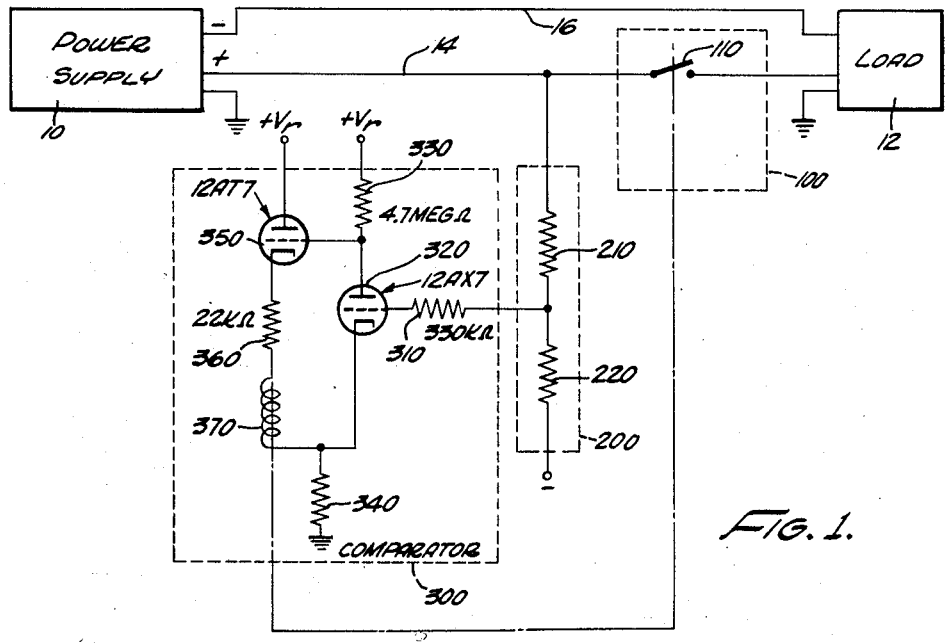
Fig. 1 is a partial schematic diagram of one embodiment of the invention.

Reference is now made to Fig. 1 wherein the comparator of the present invention is shown as controlling the operation of a switch 100 arranged to connect or disconnect a power supply 10 from a load 12 along a positive lead 14. The comparator, designated as means 300 therein, receives a power supply signal through a voltage divider 200 illustrated as comprising two resistors 210 and 220, providing a suitable division of the power supply signal to be switchably applied to load 12. Comparator 300 is connected to combining circuit 200 at the junction of resistors 210 and 220. Comparator circuit 300 is provided with a reference voltage $V_r$ which in this illustrative case is positive.

Comparator 300 comprises input resistor 310 which is connected to the grid of a first amplifier 320, the amplifier 320 having an anode resistor 330 connected to the reference voltage $V_r$ and a cathode resistor 340 which is common to the amplifier 320 and a second amplifier 350. An anode of the second amplifier 350 is then connected to the reference voltage $V_r$ and the cathode of second amplifier 350 is connected to the common cathode resistor 340 through a second cathode resistor 360 and a relay or circuit breaker armature 370 which is adapted to actuate switch means 100 which comprises a normally open switch 110.

Comparator circuit 300 is a regenerative amplifier circuit having a common cathode resistor 340 so that when amplifier 320 or amplifier 350 is conducting, the other is substantially non-conducting. For example, amplifier 320 may have a cathode current of 10 milliamperes whereas amplifier 350 may have a cathode current of 1 milliampere, and vice versa. The amplifier circuit may have circuit values as shown and may change state, i.e., the amplifier 350 may change from a conducting to a non-conducting state by the change in grid to ground voltage of the first amplifier 320 of a fraction of a volt. When the second amplifier 350 is conducting, the relay or circuit breaker winding 370 is energized and the switch 110 in switch means 100 is closed.

The invention thus may be employed to disconnect the load 12 from the power supply 10 along the positive lead 14 whenever the voltage appearing at the positive lead 14 is above or below a predetermined selected value, but in particular is adapted to disconnect the load 12 from the power supply 10 when the voltage appearing at the positive lead 14 is above a predetermined value. For this reason the negative voltage applied to the combining circuit 200 should be sufficiently negative to bias the first amplifier 320 substantially to cut-off or at least to low conductive state.

Normally when the voltage appearing in the positive lead 14 is at a desired or regulated value, the grid of first amplifier 320 can be then described as low and the anode of amplifier 320 can be described as high. The amplifier 350 has its grid connected to the anode of the first amplifier 320 and therefore is high. The amplifier 350 is then in a conductive state and the relay or circuit breaker armature 370 is then energized and the normally open switch 110 is closed whereby to connect the power supply 10 to the load 12 over the positive lead 14.

In order to operate the device of the present invention shown in Fig. 1 as an under-voltage protective circuit, the normally open switch 110 may be changed to a normally closed switch and the negative bias supplied to the combining circuit 200 must be more positive whereby the first amplifier 320 in the combining circuit 300 is operated in a normally conducting state when the positive voltage appearing on the positive lead 14 is of a desired value.

The negative voltage appearing at lead 16 may be disconnected from the load 12 when the negative voltage is too large or too small simply by applying a positive voltage to the combining circuit 200.

Summarizing the operation of the invention as shown in Fig. 1, when an excessive voltage is detected on the positive lead 14 by combining circuit 200, the grid of the first amplifier 320 is raised, the anode of the first amplifier 320 is increased and the amplifier 350 is thereby virtually maintained at cut-off, thereby de-energizing the winding 370 and opening the normally open contacts 110 of the switch means 100. In this way the power supply 10 is disconnected from the load 12.

Figure 2:
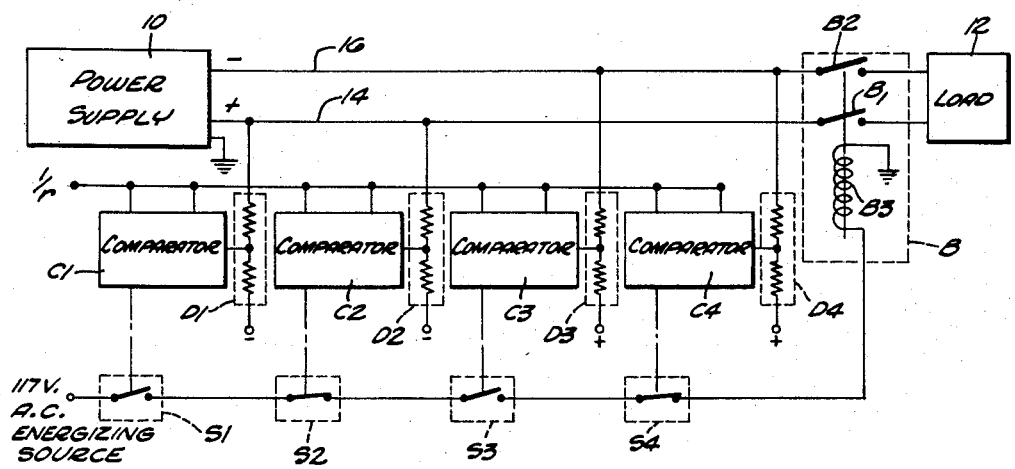
Fig. 2 is a block diagram of another embodiment of the invention.

A plurality of comparators of the type which have been described above may be employed in accordance with the invention for providing protection against over and under load conditions for one or more power supply signals. One typical example of such an arrangement is shown in Fig. 2 wherein four comparators C1, C2, C3 and C4 are employed to detect both excessive and inadequate signal levels for two power supply signals, illustrated as positive and negative voltages appearing on leads 14 and 16, respectively. Comparators C1, C2, C3 and C4 are provided with four dividing circuits D1, D2, D3 and D4 respectively, and four switch means S1, S2, S3 and S4, which are connected serially to operate a circuit breaker B having two pairs of normally open contacts B1 and B2 connected respectively in series with the positive and negative leads 14 and 16. Switches S are employed to energize a winding B3 of the circuit breaker B, one side of the winding B3 being grounded and the other side being supplied with an energizing voltage which may be any convenient A.C. or D.C. voltage, through the switches S. Comparators C are provided with a reference voltage $V_r$ as illustrated in Fig. 1.

Comparators C1 and C2 provide respectively over-voltage and under-voltage control of the positive voltage appearing in the lead 14. Comparators C3 and C4 then provide over-voltage and under-voltage protection for the voltage appearing at the negative lead 16. Over-voltage in this sense means that the negative voltage appearing at the lead 16 is too large when the comparator C3 causes the circuit breaker B to disconnect the power supply 10 from the load 12. Conversely when the negative voltage appearing at the lead 16 gets too small, comparator C4 disconnects the power supply 10 from the load 12 by actuating circuit breaker B. It is then seen that it is necessary for the switches S1 and S3 to be normally open and the switches S2 and S4 to be normally closed. It is further seen that it is necessary for the combining circuits D1 and D2 to be supplied with a negative voltage in addition to the sampled positive voltage appearing at the lead 14 and that the combining circuits D3 and D4 be supplied with a positive biasing voltage in addition to the negative biasing voltage taken from the negative lead 16.

It is then necessary to keep the circuit breaker B energized whenever the voltages appearing at the leads 14 and 16 are within desired limits. For this reason then the switches S1 and S3 are closed during the satisfactory operation of the power supply 10 to impress voltages of satisfactory magnitudes upon the leads 14 and 16. Since the switch S1 must be normally closed when the apparatus is operating satisfactorily, comparator C1 is connected identically with the comparator shown in Fig. 1, i.e., combining circuit D1 is supplied with a negative voltage sufficiently negative to bias the first amplifier whereby the relay winding in the second amplifier cathode circuit is normally energized and the switch S1 thereby closed.

Comparator C2 provides under-voltage control for the voltage appearing at the leads 14 simply by incorporating a normally closed switch S2 and by providing a negative voltage to the combining circuit D2 which causes the first amplifier to be normally conducting, i.e., the grid of the first amplifier to be positive or high. The second amplifier then does not pass sufficient current to energize the relay winding in its cathode circuit and the switch S2 remains closed until there is a voltage variation on the positive lead 14 which brings that voltage down to a value to cause the relay winding in the second amplifier cathode circuit to be energized and thereby to open the switch S2.

As stated previously, comparator C3 provides over-voltage protection for the negative voltage appearing at the negative lead 16. Accordingly, the combining circuit D3 is provided with a positive voltage. This positive voltage, however, is not so positive as to cause the first amplifier to conduct to close the switch S3 whereby the circuit breaker B may be energized to connect the power supply 10 to the load 12 when the magnitude of the voltage appearing at the lead 16 is at a satisfactory value.

Comparator C4 provides under-voltage protection for the negative output voltage of the power supply 10 and accordingly the positive voltage applied to the combining circuit D4 must be sufficient to cause the first amplifier to conduct and thereby to keep the switch S4 closed by keeping the relay winding in the cathode circuit of the second amplifier normally de-energized during the satisfactory operation of the power supply 10. It is to be noted that all of the switches S are connected serially with the winding B3 of the circuit breaker B whereby the circuit breaker B may be de-energized when the load 12 may be subjected to over-voltages or under-voltages along either of the positive or negative leads 14 or 16.

It is to be noted that the circuit breaker B is employed to avoid the necessity of employing a plurality of normally open switches serially connected in each of the leads 14 and 16 for each of the comparators C1 and C3 and a pair of normally closed switches connected serially in each of the leads 14 and 16 for each of the comparators C2 and C4.

Another arrangement wherein a plurality of comparators may be employed in accordance with the invention is illustrated in Fig. 3. The particular feature of this arrangement is that only two comparators are required to provide protection for both under and over-voltage conditions for two power supply signals. Thus a considerable saving may be made over that which is required for the species of Fig. 2.

As shown in Fig. 3 a circuit breaker means M is adapted to disconnect the power supply 10 from load 12. The circuit breaker means M forms a portion of the protective circuit of the invention shown in Fig. 3 and includes a combining circuit or voltage divider 30. Voltage divider 30 is actually employed to sum the voltages appearing in the leads 14 and 16. Voltage divider 30, however, also makes the use of a separate negative or positive biasing source unnecessary. It is obvious that such would be necessary when vacuum tubes are employed in the comparators with which the voltage divider 30 may be used. The voltage divider 30 is in fact used with two voltage comparators A and B which are connected from the voltage divider 30 and referenced to voltage $V_r$. Switch means AS and BS responsive to the conductive states of the comparators A and B respectively are then connected to circuit breaker means M for actuating the same.

The voltages on output leads 14 and 16 of power supply 10 may be different, i.e., positive or negative respectively, as before. The voltage divider 30 thus impresses a voltage proportional to the difference between the voltages appearing between leads 14 and 16 upon comparator A. The voltage impressed upon comparator A by voltage divider 30 is less than the voltage impressed upon comparator B by voltage divider 30.

The combining circuit of voltage divider 30 comprises three resistors R51, R53 and R54 which are connected serially. Resistor R54 is connected to the negative lead 16 and resistor R51 is connected to the positive lead 14. Resistor R53 is connected intermediate the resistors R51 and R54 to provide different voltage inputs to the comparators A and B which are connected to opposite sides of resistor R53. Resistors R may have the values shown.

In the representative example, the output leads 14 and 16 of power supply 10 have voltages impressed upon them which are respectively 150 volts positive with respect to ground and 150 volts negative with respect to ground. It is to be noted that resistor R53 has a resistance which is substantially less than either that of resistor R51 or of R54. Thus the potential at either the negative or positive side of the resistor R53 is very nearly at ground potential, the resistances of the resistors R51 and R54 being substantially the same. Comparators A and B may be provided with a 300 volt reference voltage $V_r$.

When power supply 10 is connected to load impedance 12 and all circuitry is working satisfactorily including the protective circuit of the invention, then the negative side of resistor R53 in voltage divider 30 is maintained at a potential sufficiently negative to cause the relay winding of a comparator A to be energized, and switch AS to be opened. However, comparator B which is provided with a corresponding relay operable switch BS is connected to the positive side of resistor R53 which may be sufficiently positive to cause the relay within comparator B to be de-energized.

Circuit breaker means M shown in Fig. 3 comprises a time delay relay K3 and a circuit breaker K5 which connects or disconnects load impedance 12 to power supply 10 depending upon the energization of a winding 23 of circuit breaker K5. Normally open contacts DE and GH of circuit breaker K5 are adapted to connect power supply 10 through leads 14 and 16 to load impedance 12 when the winding 23 of circuit breaker K5 is energized. This is accomplished through two normally closed contacts 5 and 7 of time delay relay K3 which has a heating element winding 24. One terminal of winding 23 of circuit breaker K5 is normally connected to ground. The other side of winding 23 is connected through the normally closed contacts 5 and 7 of time delay relay K3 to a 117 v. A.-C. energizing source of potential. Thus the winding 23 of circuit breaker K5 is de-energized when the normally closed contacts 5 and 7 of time delay relay K3 are opened.

The normally closed contacts 5 and 7 of time delay relay K3 are opened when the winding 24 of the time delay relay K3 is energized through either of the switch means AS or BS. It is to be noted that switch means AS and BS are connected in parallel rather than in series as switches S in Fig. 2. This is necessary because energization of time delay relay K3 causes de-energization of circuit breaker K5 instead of the switch means AS and BS causing simple de-energization of circuit breaker K5. Furthermore, comparator A is a positive over-voltage and negative under-voltage circuit. For this reason switch means AS is opened under satisfactory operation by energization of the second amplifier relay of comparator A and must therefore be normally closed. For the converse reason switch means BS must be normally open.

The operation of the protective circuit may be summarized as follows: the comparators A and B incorporate a trigger circuit whereby the protective circuit of the present invention is made more sensitive than protective circuits known in the prior art. By the use of the voltage divider 30 the use of the trigger circuits or comparators A and B will disconnect the load impedance 12 from the power supply 10 when either voltage appearing at lead 14 or at lead 16 are too high or too low, that is, when they are above or below selected values. The time delay relay K3 in Fig. 3 serves to prevent the load impedance 12 from being disconnected from the power supply 10 due to transient voltages and discontinuous overloads.

The protective circuit of the invention is disabled under certain specific conditions. Specifically, the protective circuit is disabled when the voltage appearing at lead 14 becomes more positive by an amount substantially equal to a simultaneous change in the voltage appearing at the lead 16 in a more negative direction. The protective circuit of the present invention is also disabled when the voltage appearing at lead 14 becomes less positive by an amount substantially equal to a simultaneous change in voltage appearing at the lead 16 in a less negative direction. However, conventional power supplies will not generally provide voltages, positive and negative, which will vary the same amount in the same or opposite polarities; hence, the conditions under which the protective circuit of the present invention is disabled are considered trivial.

In addition, when the reference voltage $V_r$ is applied to all comparators, one of the comparators is bound to prevent a line-to-load connection if the reference voltage fails. Thus the protective circuit provides another safety feature.

It is also evident in Fig. 3 that the resistor R53 may be omitted and two resistors from each of the leads 14 and 16 provided. One resistor from lead 14 may be connected to one from lead 16 to provide an input for comparator A and the other pair connected to provide an input comparator B. In this manner any number of power supplies may be provided with a protective circuit of only two comparators by connecting the resistor junctions of each voltage divider. It is obvious, however, that a biasing potential source must be provided for each comparator when all power supply voltages are of the same polarity.

From the foregoing description it should now be apparent that the present invention provides an improved abnormal voltage protection circuit which is highly sensitive, is adapted to detect both under and over-voltage conditions, may be employed as a protective device for a plurality of power supply signals, is inherently self-checking, and has a greatly reduced hysteresis characteristic. While these particular features have been stressed herein, it will be understood that the various other improvements which may have been noted may be considered to be important in particular applications.

Several arrangements employing the basic comparator of the invention have been illustrated in order to point out the generic nature thereof. Thus it has been shown that the comparators may be operated from either a normally energized or a normally de-energized state for either under or over-voltage detection operations depending upon the type of switch which is associated therewith. Furthermore, it has been shown that the switch connections may be varied, being typically in series or in parallel depending upon the type of circuit breaker which is employed.

It should be noted further that the term "circuit breaker" does not necessarily imply a relay since the comparator relay winding itself may control the breaking action of a switch, such as is shown in Fig. 1 herein.

While a few illustrative modifications have been particularly described, it is understood that a multitude of other variations will be recognized by those skilled in the art. Therefore, it will be understood in interpreting the appended claims that no specific limitation is intended with reference to the specific disclosure herein, except as is expressly defined in these claims.

What is claimed is:

1. In an abnormal voltage protective device for disconnecting a power supply from a load when the output voltage of the power supply passes from a normal operating range through a critical voltage to an abnormal operating range, the combination comprising: a circuit breaker having a pair of contacts connected serially between the power supply and the load, and an amplifier circuit both for impressing a first voltage on said circuit breaker when the output voltage of said power supply is in said normal operating range, and for impressing a second voltage on said circuit breaker when said power supply output voltage passes through said critical voltage and enters said abnormal operating range, said first voltage causing said contacts to close and said second voltage causing said contacts to open, said amplifier circuit including a direct-coupled regenerative amplifier for impressing a voltage on said circuit breaker changing at a rapidly increasing rate when said power supply output voltage becomes very nearly equal to, but continues to approach said critical voltage while in said normal operating range.

2. The invention as defined in claim 1, wherein said regenerative amplifier includes first means, second means for impressing an input voltage on said first means proportional to said power supply output voltage, said first means being adapted to amplify said input voltage, and third means responsive to said amplified input voltage both for impressing said first and second voltages on said circuit breaker, and for impressing a feedback voltage on said first means proportional to said amplified input voltage in addition to said input voltage, said feedback voltage being proportional to said amplified input voltage.

3. The invention as defined in claim 2, wherein said regenerative amplifier is a Schmidt trigger circuit; and wherein said first means includes a voltage divider to level shift said power supply output voltage for producing an input voltage to said Schmidt trigger circuit.

4. The invention as defined in claim 2, wherein said first means includes an input amplifier having a high impedance input circuit to receive said input voltage and a low impedance input circuit; a feedback resistor connected serially with said low impedance input circuit; wherein said third means includes a variable impedance element having a current control electrode connected from the output of said input amplifier, a biasing resistor; said variable impedance element, said biasing resistor, and said circuit breaker being connected serially from a source of positive potential to said input amplifier low impedance input circuit.

5. In an abnormal voltage protective device for disconnecting a pair of output leads of a power supply from a load, said power supply being adapted to impress a different output voltage on each of said output leads, said protective device including a circuit breaker having a pair of contacts serially connected with each of said output leads, the combination comprising: a first amplifier circuit both for impressing a first voltage on said circuit breaker when the sum of said output voltages is below a predetermined upper limit, and for impressing a second voltage on said circuit breaker when the sum of said output voltages increases beyond said predetermined limit; a second amplifier circuit both for impressing a third voltage on said circuit breaker when the sum of said output voltages is above a predetermined lower limit, and for impressing a fourth voltage on said circuit breaker when the sum of said output voltages is below said predetermined lower limit, said first and third voltages causing said pair of contacts to close and said second and fourth voltages causing said pair of contacts to open; and means for impressing an input voltage on each of said amplifier circuits proportional to the sum of the output voltages of said power supply, each of said input voltages to each corresponding amplifier circuit differing by a predetermined amount, said input voltage to said one of said amplifier circuits biasing it to cutoff and said input voltage to the other of said second amplifier circuits providing positive bias to it to make it conductive, each of said amplifiers reversing their states upon a correspondng increase or decrease in the sum of the output voltages of said power supply.

6. The invention as defined in claim 5, wherein said means for impressing input voltages on said amplifier circuits includes first, second and third resistors connected serially respectively from one of said power supply output leads to the other, said first amplifier circuit being connected to the most positive terminal of said second resistor and said second amplifier circuit being connected to the most negative terminal of said second resistor.

7. In an abnormal voltage protective device for disconnecting a pair of output leads of a power supply from a load, said power supply being adapted to impress a different output voltage on each of said output leads, said protective device including a circuit breaker having a pair of contacts serially connected with each of said output leads, the combination comprising: a first amplifier circuit both for impressing a first voltage on said circuit breaker when the sum of said output voltages is below a predetermined upper limit, and for impressing a second voltage on said circuit breaker when the sum of said output voltages increases beyond said predetermined limit; a second amplifier circuit both for impressing a third voltage on said circuit breaker when the sum of said output voltages is above a predetermined lower limit, and for impressing a fourth voltage on said circuit breaker when the sum of said output voltages is below said predetermined lower limit, said first and third voltages causing said pair of contacts to close and said second and fourth voltages causing said pair of contacts to open;

each of said amplifier circuits including a regenerative amplifier for impressing a voltage on said circuit breaker changing at a rapidly increasing rate when the sum of said power supply output voltages becomes very nearly equal to, but only continues to approach one of said predetermined limits while in a normal operating range between said predetermined limits.

8. The invention as defined in claim 7, wherein first means are provided to impress first and second input voltages on said first and second amplifier circuits respectively; and wherein said regenerative amplifier and said first amplifier circuit includes second means to amplify said first input voltage, and third means responsive to said second amplified input voltage both for impressing said first and second voltages on said circuit breaker, and for impressing a first feedback voltage on said second means proportional to said second amplified input voltage in addition to said amplified input voltage, said second feedback voltage being proportional to said second amplified input voltage; and wherein said regenerative amplifier in said second amplifier circuit includes fourth means to amplify said second input voltage, and fifth means responsive to said second amplified input voltage both for impressing said third and fourth voltages on said circuit breaker, and for impressing a second feedback voltage on said fourth means proportional to said second amplified input voltage in addition to said input voltage, said second feedback voltage being proportional to said second amplified input voltage.

9. The invention as defined in claim 8, wherein said first means includes first, second and third resistors connected serially from one of said power supply output leads to the other, said second means being connected to the most positive terminal of said second resistor and said fourth means being connected to the most negative terminal of said second resistor.

10. In an abnormal voltage protective device for disconnecting a pair of output leads of a power supply from a load, said power supply being adapted to impress a different input voltage on each of said output leads, said protective device including gating means to connect said power supply to and to disconnect said power supply from the load selectively, the combination comprising: a first amplifier both for impressing a first voltage on said gating means when the sum of said output voltages is below a predetermined upper limit and for impressing a second voltage on said gating means when the sum of said output voltages increases beyond said predetermined limit; a second amplifier circuit both for impressing a third voltage on said gating means when the sum of said output voltages is above a predetermined lower limit, and for impressing a fourth voltage on said gating means when the sum of said output voltages is below said predetermined lower limit, said first and third voltages causing said gating means to connect said power supply to the load and said second and fourth voltages causing said gating means to disconnect said power supply from the load; and means for impressing an input voltage on each of said amplifier circuits proportional to the sum of the output voltages of said power supply, each of said input voltages to each corresponding amplifier circuit differing by a predetermined amount, said input voltage to said one of said amplifier circuits biasing it to cut off and said input voltage to the other of said second amplifier circuit providing positive bias to make it conductive, each of said amplifiers reversing their states upon a corresponding increase or decrease in the sum of the output voltages of said power supply.

11. In an abnormal voltage protective device for disconnecting a power supply from a load when the output voltage of the power supply passes from the normal operating range through a critical voltage to an abnormal operating range, the combination comprising: gating means to connect said power supply to and to disconnect said power supply from the load selectively; and a direct-coupled regenerative amplifier for impressing a first voltage on said gating means when the output voltage of said power supply is in said normal operating range, and for impressing a second voltage on said gating means when said power supply output voltage passes through said critical voltage and intersects abnormal operating range, said first and second voltages being substantially different by virtue of the operation of said regenerative amplifier, one of said voltages causing said gating means to connect said power supply to the load and the other of said voltages causing said power supply to be disconnected from the load by said gating means.

12. In an abnormal voltage protective device for disconnecting a power supply from a load when the output voltage of the direct-current power supply passes from the normal operating range through a critical voltage to an abnormal operating range, the combination comprising: gating means to connect said power supply to and to disconnect said power supply from the load selectively, and a direct-coupled, direct-current regenerative amplifier for impressing a first voltage on said gating means when the output voltage of said power supply is in said normal operating range, and for impressing a second voltage on said gating means when said power supply output voltage passes through said critical voltage and intersects abnormal operating range, said first and second voltages being substantially different by virtue of the operation of said regenerative amplifier, one of said voltages causing said gating means to connect said power supply to the load and the other of said voltages causing said power supply to be disconnected from the load by said gating means.

13. In an abnormal voltage protective device for disconnecting a direct-current power supply from a load when the output voltage of the power supply passes from the normal operating range through a critical voltage to an abnormal operating range, the combination comprising: gating means to connect said power supply to and to disconnect said power supply from the load selectively; and a direct-coupled regenerative amplifier for impressing a first voltage on said gating means when the output voltage of said power supply is in said normal operating range, and for impressing a second voltage on said gating means when said power supply output voltage passes through said critical voltage and intersects abnormal operating range, said first and second voltages being substantially different by virtue of the operation of said direct-coupled regenerative amplifier, one of said voltages causing said gating means to connect said power supply to the load and the other of said voltages causing said power supply to be disconnected from the load by said gating means.

References Cited in the file of this patent

UNITED STATES PATENTS

| | | |
|---|---|---|
| 2,599,228 | Brown | June 3, 1952 |
| 2,601,473 | Van Weynsbergen | June 24, 1952 |
| 2,645,765 | Bixby | July 14, 1953 |
| 2,809,293 | Rambo | Oct. 8, 1957 |